(12) United States Patent
Perlmutter et al.

(10) Patent No.: US 10,567,468 B2
(45) Date of Patent: Feb. 18, 2020

(54) METHOD AND SYSTEM FOR TRANSPARENTLY MANIPULATING DOWNLOADED FILES

(71) Applicant: CHECK POINT SOFTWARE TECHNOLOGIES LTD., Tel Aviv (IL)

(72) Inventors: Amnon Perlmutter, Givatayim (IL); Lior Drihem, Givat Shmuel (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 516 days.

(21) Appl. No.: 14/979,569

(22) Filed: Dec. 28, 2015

(65) Prior Publication Data

US 2017/0187682 A1    Jun. 29, 2017

(51) Int. Cl.
  *H04L 29/08*   (2006.01)
  *H04L 29/06*   (2006.01)
(52) U.S. Cl.
  CPC .............. *H04L 67/02* (2013.01); *H04L 63/02* (2013.01); *H04L 63/0428* (2013.01); *H04L 63/168* (2013.01); *H04L 67/06* (2013.01); *H04L 67/2814* (2013.01)

(58) Field of Classification Search
  CPC ..... H04L 63/0245; H04L 67/02; H04L 67/06; H04L 29/08
  See application file for complete search history.

(56) References Cited

U.S. PATENT DOCUMENTS

| | | | | |
|---|---|---|---|---|
| 7,921,226 B2* | 4/2011 | Mukherjee | .............. | H04L 67/06 709/238 |
| 8,341,200 B2* | 12/2012 | Corella | .................. | H04L 63/08 707/782 |
| 9,124,472 B1* | 9/2015 | Schneider | ......... | H04L 29/08072 |
| 2008/0065782 A1* | 3/2008 | Jones | ................. | G06Q 30/0601 709/240 |
| 2008/0270578 A1* | 10/2008 | Zhang | ................. | H04L 63/0807 709/219 |
| 2008/0295176 A1* | 11/2008 | Holostov | .............. | G06F 21/562 726/24 |
| 2009/0088188 A1* | 4/2009 | Wormald | ................ | H04W 4/18 455/466 |
| 2014/0372624 A1* | 12/2014 | Wang | ..................... | H04L 65/60 709/231 |

* cited by examiner

*Primary Examiner* — Khoi V Le
(74) *Attorney, Agent, or Firm* — Mark M. Friedman

(57) ABSTRACT

Methods and systems provide mechanisms for inspection devices, such as firewalls and servers and computers associated therewith, to selectively manipulate files, for which a download has been requested. The manipulation is performed in a manner which is transparent to the requesting user.

18 Claims, 9 Drawing Sheets

| Unique ID | FILE |
|---|---|
| XXXXXXXXXX | XYZ.doc |
| YYYYYYYYYY | pdq.jpg |
| ○ | ○ |
| ○ | ○ |
| ○ | ○ |

METHOD AND SYSTEM FOR TRANSPARENTLY MANIPULATING DOWNLOADED FILES

TECHNICAL FIELD

The present invention is directed to manipulating files for which downloads thereof have been requested.

BACKGROUND

Files are constantly being downloaded by users from the world wide web (WWW) over various computer and communication networks. Downloading files becomes increasingly risky to networks and computers, as these files may contain malicious content, the can potentially destroy networks and computers associated therewith.

Enterprises, Internet Service Providers (ISPs) and other organizations which maintain networks often place an inspection device, commonly known as a "firewall," between the internal network and an external network, such as the Internet. These firewalls typically scan downloaded files, and either allow or block the download of the file. However, upon blocking the download, many times, portions of the file have already leaked to the requesting client, with this leaked portion possibly containing malicious content.

SUMMARY OF THE INVENTION

The present invention provides mechanisms for selectively manipulating files, for which a download has been requested, in a manner which is transparent to the requesting user, by an inspection device or the like. The inspection device is, for example, a firewall and servers and computers associated therewith. The selective manipulations occur prior to the manipulated file being sent to the user computer associated with the file request, without any leakage of the requested file to the user's network or machine, avoiding malicious content from entering the network or the computer. Additionally, the invention is such that the file types, which are subject to the selective manipulations, are selectable by the administrator or other entity controlling the inspection device.

The manipulation in accordance with the present invention may include, for example, one or more of manipulations of files such as, replacing the downloaded file with a safer version of it, completely blocking the file and preventing the download, and holding the file for inspection of various aspects of the file.

The invention minimally impacts network performance and latency, as connections are maintained and not terminated. This is because the requested files are inspected passively by the inspection device, such that connections do not have to be terminated.

The present invention provides inspection devices, such as firewalls, and servers associated therewith, the ability to enforce Hypertext Transport Protocol (HTTP) header transparency.

Embodiments of the invention are directed to methods for manipulating a file. These methods comprise: receiving, at a computerized inspection device, for example, a firewall and/or gateway, a response including a file download; downloading, by the computerized inspection device, the file associated with the response, and associating the downloaded file with an indicator, the computerized inspection device maintaining the downloaded file to prevent leaking of the downloaded file from the computerized inspection device (such that the downloaded file does not leak to any requesting destination, such as a requesting client computer); transmitting, by the computerized inspection device, a redirect request associated with the downloaded file and the indicator associated with the downloaded file, to the client computer; receiving, by the computerized inspection device, from a client computer, the redirect request, and, the computerized inspection device correlating the indicator of the redirect request and the indictor of the downloaded file; analyzing the downloaded file for modification if necessary; and, should the indicators be correlated (e.g., matching or being otherwise equivalent), transmitting, by the computerized inspection device, the analyzed downloaded file to the client computer.

Optionally, the correlating the indicator of the redirect request and the indictor of the downloaded file includes matching the indicator of the redirect request and the indictor of the downloaded file.

Optionally, the redirect request is self executing.

Optionally, the analyzing the downloaded file includes modifying the downloaded file.

Optionally, the analyzing the downloaded file includes not modifying the downloaded file.

Optionally, the response is returned to the computerized inspection device from a computer along a network external to the computerized inspection device.

Optionally, the indicator includes at least one of a token, and, a unique identifier.

Optionally, the response is based on a file download request issued from a client computer, the file download request which has passed through the computerized inspection device.

Optionally, the method is such that the computerized inspection device: obtains the Hypertext Transport Protocol (HTTP) headers of the file download request; cancels the file download request; and, generates a new file download request including the HTTP headers from the file download request.

Optionally, the computerized inspection device transmits the new file download request including the HTTP headers to a destination associated with the file of the file download request, in response to: a) receiving, by the computerized inspection device, from the client computer, the redirect request, and, b) the computerized inspection device correlating the indicator of the redirect request and the indictor of the downloaded file.

Embodiments of the invention are directed to a computer-usable non-transitory storage medium having a computer program embodied thereon for causing a suitable programmed system to manipulate a computer file, by performing the following steps when such program is executed on the system. The steps comprise: receiving a response including a file download; downloading the file associated with the response, associating the downloaded file with an indicator, and, maintaining the downloaded file to prevent leaking of the downloaded file from a computerized inspection device; transmitting a redirect request associated with the downloaded file and the indicator associated with the downloaded file, to a client computer; receiving from the client computer, the redirect request, and, correlating the indicator of the redirect request and the indictor of the downloaded file; analyzing the downloaded file for modification if necessary; and, should the indicators be correlated, transmitting the analyzed downloaded file to the client computer.

Optionally, with the computer-usable non-transitory storage medium, the step of correlating the indicator of the redirect request and the indictor of the downloaded file includes matching the indicator of the redirect request and the indictor of the downloaded file, and the indicator includes at least one of a token, and, a unique identifier.

Optionally, with the computer-usable non-transitory storage medium, the redirect request is self executing.

Optionally, with the computer-usable non-transitory storage medium, the analyzing the downloaded file includes modifying the downloaded file.

Optionally, with the computer-usable non-transitory storage medium, the analyzing the downloaded file includes not modifying the downloaded file.

Optionally, with the computer-usable non-transitory storage medium, the response is received from a computer along an external network associated with a file for which a download has been requested.

Optionally, with the computer-usable non-transitory storage medium, the response is based on a file download request issued from a client computer.

Optionally, the computer-usable non-transitory storage medium additionally causes performance of the steps: obtaining the Hypertext Transport Protocol (HTTP) headers of the file download request; cancelling the file download request; and, generating a new file download request including the HTTP headers from the file download request.

Optionally, the computer-usable non-transitory storage medium additionally causes performance of the step: transmitting the new file download request including the HTTP headers to a destination associated with the file of the file download request, in response to: a) receiving, the redirect request, and, b) the correlating of the indicator of the redirect request and the indictor of the downloaded file.

Other embodiments of the invention are directed to a computerized inspection device, for example, a computer, machine, firewall, or gateway, comprising storage media in communication, for example, electronic and/or data communication, with a processor. The storage media holds downloaded files. The processor is programmed to: receive a response including a file download, the response being the result of a file download request issued from a client computer, which has passed through the computerized inspection device; download the file associated with the response for storage in the storage media, and, associate the downloaded file with an indicator; cause the storage media to maintain the downloaded file by preventing leaking of the downloaded file from the storage media; transmit a redirect request associated with the downloaded file and the indicator associated with the downloaded file, to the client computer; receive, from the client computer, the redirect request, and, the computerized inspection device correlating the indicator of the redirect request and the indictor of the downloaded file; analyze the downloaded file for modification if necessary; and, should the indicators be correlated, transmitting the analyzed downloaded file to the client computer.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

HTTP (Hypertext Transfer Protocol) is an application protocol for distributed, collaborative, hypermedia information systems. Hypertext is structured text that uses logical links (hyperlinks) between nodes containing text. HTTP is the protocol to exchange or transfer hypertext.

URL (Uniform Resource Locator) is a reference to a resource that specifies the location of the resource on a computer network and a mechanism for retrieving it, such as an address of a specific Web site or file on the Internet.

SSL (Secure Sockets Layer) is a standard security technology for establishing an encrypted link between a server and a client—for example, a web server (website) and a browser; or a mail server and a mail client.

TCP (Transport Control Protocol) is a protocol developed for the Internet for transporting data between network devices.

UDP (User Datagram Protocol) is a communications protocol that offers a limited amount of service when messages are exchanged between computers in a network that uses the Internet Protocol (IP). UDP is an alternative to the Transmission Control Protocol (TCP) and, together with IP, is sometimes referred to as UDP/IP.

A "firewall" is a network security system, either hardware-based or software-based, that controls incoming and outgoing network traffic based on a set of rules.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 1B is a diagram of a list in accordance with the system of FIG. 1A;

FIGS. 2C-1 and 2C-2 are a flow diagram of an alternative processes in accordance with embodiments of the disclosed subject matter;

DETAILED DESCRIPTION OF THE DRAWINGS

Figure 1A:
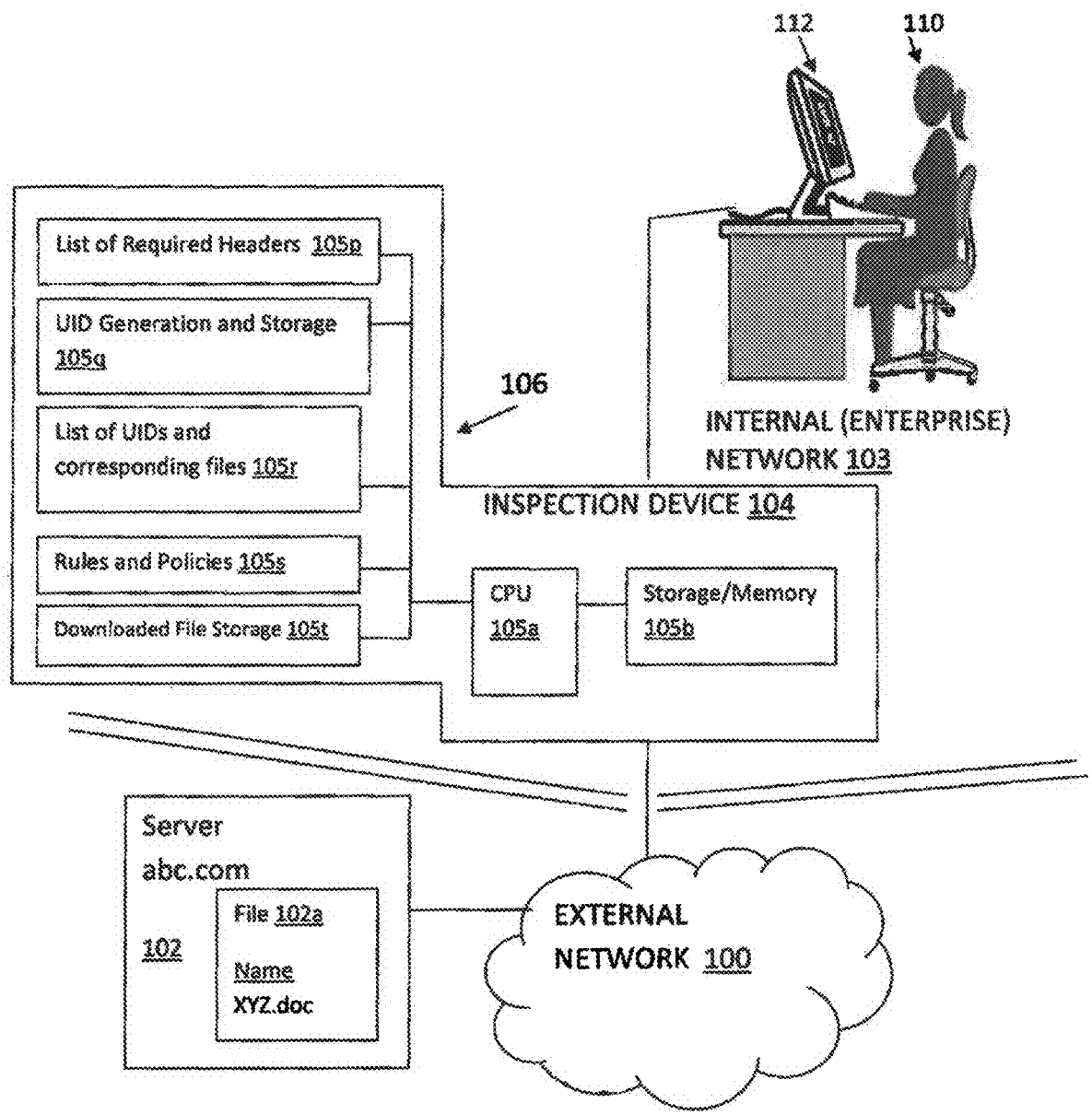
FIG. 1A is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

The present invention in some embodiments is directed to a network inspection device, commonly known as a "firewall," which serves as a gateway between an external network and an internal, for example, an enterprise network, to which client computers are linked. The network inspection device, for example, uses segment injection to redirect HTTP requests, which are detected as downloads of relevant or otherwise predetermined, file types, to the inspection device or another device or location. The redirect HTTP requests include, for example, a unique token or identifier, while retaining the URL and the HTTP headers, for example, all of the HTTP headers, of the original HTTP download request. The next or subsequent HTTP request, to the redirected URL, also known as a "redirect" or "redirect request" includes the aforementioned token or unique identifier. Additionally, the inspection device generates an identical HTTP request, to the same URL with the same header, for the file to be downloaded locally, to the inspection device. The network inspection device can now inspect files, provided they are of a designated file type, and take action on the file, either blocking its download, modifying the downloaded file and returning it to the requesting client computer, or, returning the downloaded file to the requesting client computer in its present form, absent modification. The returned file may be renamed.

Optionally, the inspection device can be configured with a Network Address Translation or Network Address Translator (NAT). NAT is the translation of an Internet Protocol address (IP address) used within one network to a different IP address known within another network. One network is designated the inside network and the other is the outside. With a NAT, the request will have the same source IP (Internet Protocol).

Reference is now made to FIG. 1A, which shows an exemplary operating environment, including a network 100, to which is linked a server 102, representative of the multitudes of servers that link to the network 100. For example, the server 102 includes a file 102*a*, representative of multitudes of downloadable files. This file 102 is, for example a .doc (document) file with the name XYZ.doc, and is downloadable by computers, such as client computer 112, linked to the internal network 103. The network 100 is an external network, which links to an internal network (shown as separated from the external network 100 by the double lines), such as a local network, for example, an enterprise network 103, which is protected by an inspection device 104, which links to the external network 100.

The inspection device 104 is, for example, one or more computers, and defines a system 106 (hereinafter, the "system"), which performs the present invention, including processed thereof. The inspection device 104 includes computer components, such as processors, storage/memory, storage media, modules, engines and other computer components, including those at external locations linked to the inspection device 104.

The inspection device 104 includes processors (e.g., a Central Processing Unit (CPU) 105*a*), linked to storage/memory 105*b*. There are also modules and/or storage media 105*p*, 105*q*, 105*r*, 105*s*, 105*t* of the inspection device 104, which operate in conjunction with the CPU 105*a* and storage/memory 105*b* to perform the present invention. Additional processors, storage/memory, modules and storage media may also be part of the system for performing the invention, however, the components most germane to performing the invention are described herein.

Figures 1, 2A:
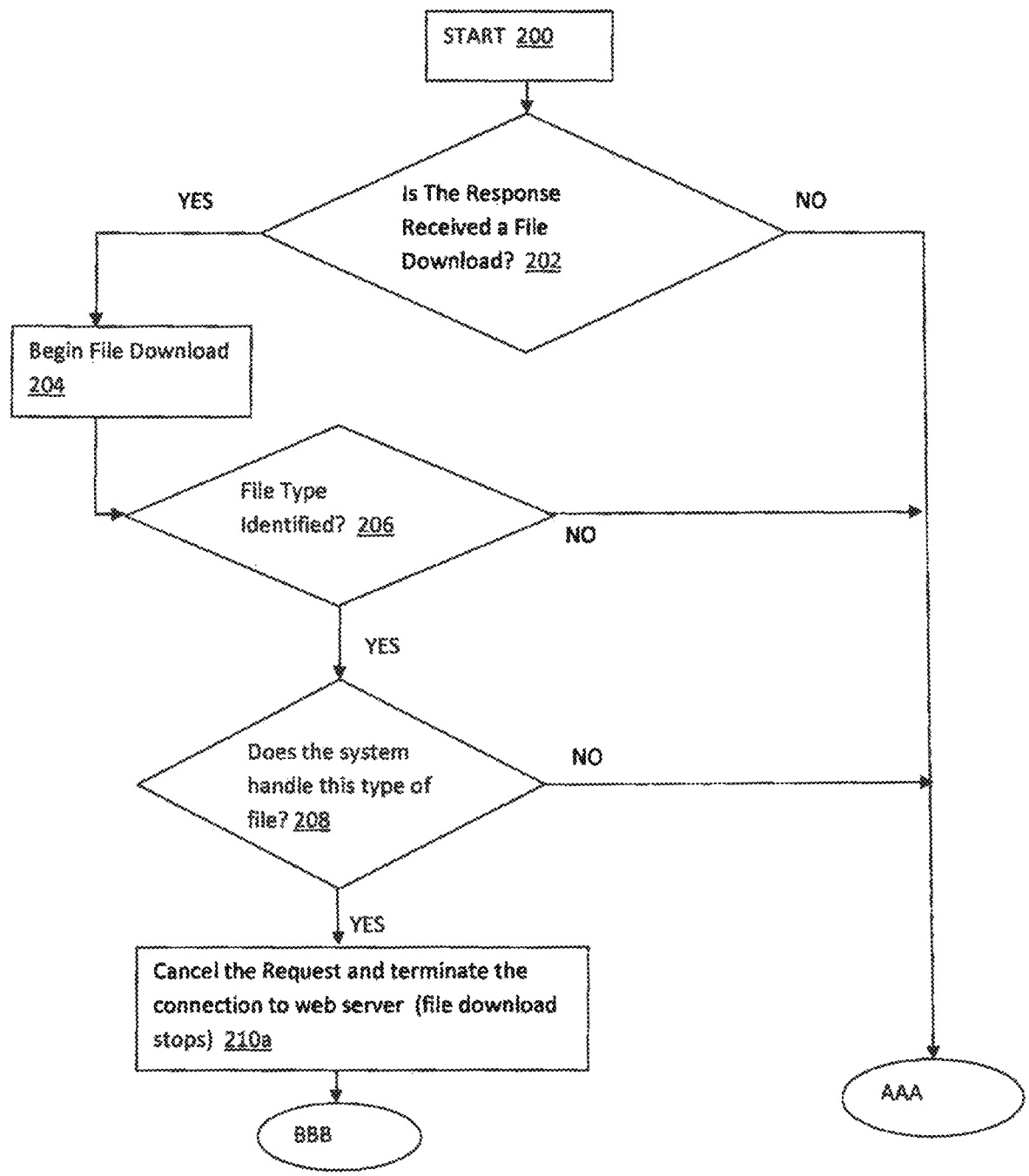
FIGS. 2A-1 and 2A-2 are a flow diagram of processes in accordance with embodiments of the disclosed subject matter.
Figures 2, 2A:
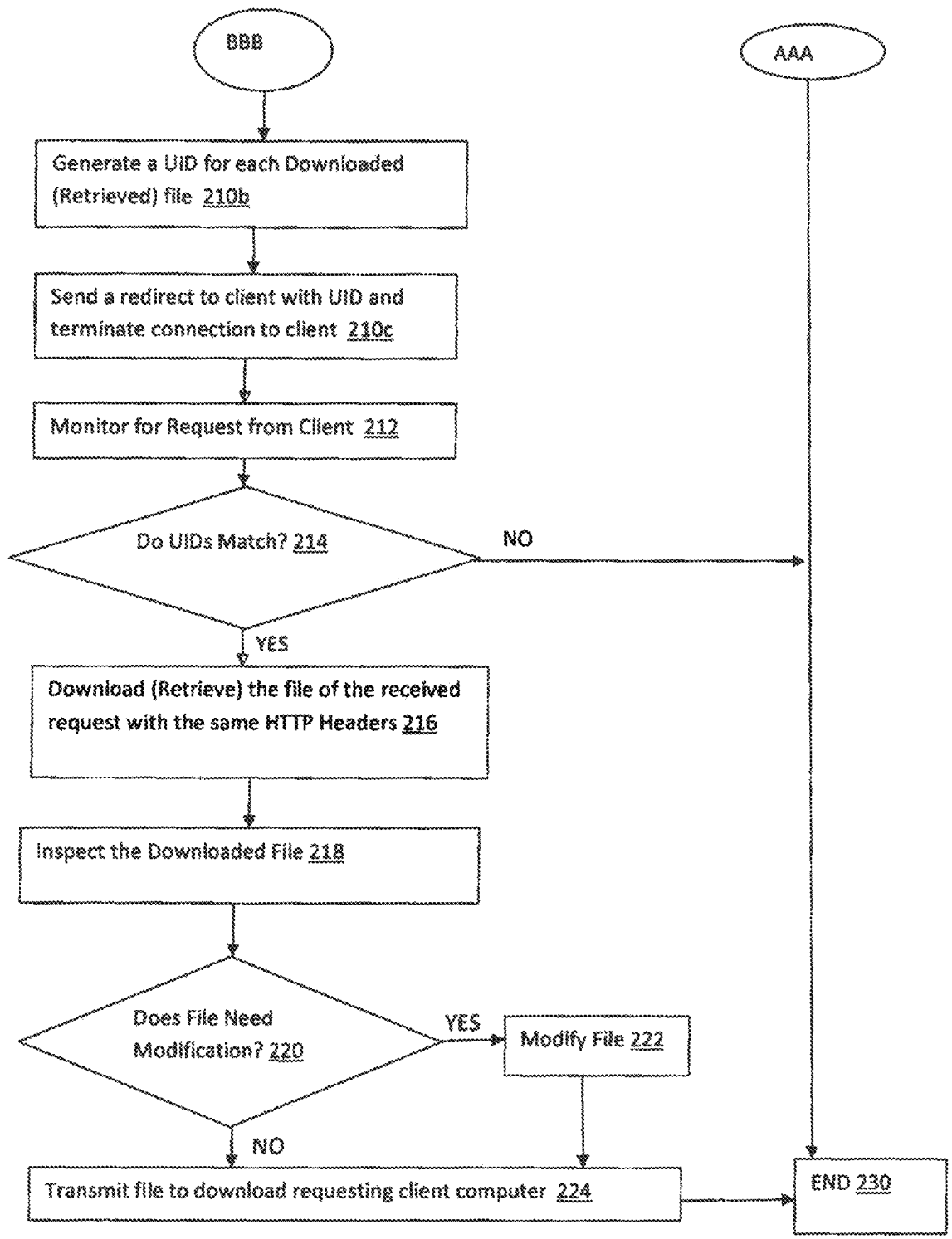

The storage/memory 105*b* stores machine-executable instructions executed by the CPU 105*a* for performing the processes of the invention, for example, those detailed in FIGS. 2 and 3, which when programmed accordingly in to the CPU 105*a*, serve as a firewall, between the internal network, e.g., local or enterprise network 103, and the external network 100. Some of the machine executable instructions, for execution by the CPU 105*a* include those for scanning all HTTP/S requests and responses, and uses one or more of (combinations of): 1) Content-Disposition HTTP Header; 2) Content-Type HTTP header; 3) Filename Suffix in URL, e.g., http://abc.i.docx, with "docx" the suffix; and, 4) the file type (also referred to as "magic") itself returned in responses, to detect whether the client computer 112 (e.g., a user 110) is downloading a relevant file type. There may also be additional servers associated with the inspection device 102, typically when the inspection device 104 is a firewall.

The inspection device 104 is associated with modules, engines and other computer components for performing the processes of the invention as disclosed herein. The inspection device 104, and the servers, computers and the like associated therewith also include storage media, databases and the like, which include, for example, a list of required headers 105p, a list of Unique Identifiers (Unique IDs or UIDs) 105q, which include for example, names, codes, tokens, a list of UIDs corresponding files 105r, as shown in FIG. 1B, and stored rules and policies 105s for the inspection device 104. There is also storage media for downloaded files 105t, which although shown as internal to the inspection device/system 106, may be external, including in the cloud.

As shown in FIG. 1B, there is a list 105r of UIDs, for example, tokens, and corresponding files. This list 105r, for example, shows that token XXXXXXXXXXX is for file XYZ.doc, and token YYYYYYYYYYY is for file pdq.jpg.

The CPU 105a, via instructions from the storage/memory 105b, along with any other instructions, rules and policies and the like, entered into the CPU 105a, is such that the network inspection device 104 provides TCP/UDP packet data for examination, without interfering with the connection or pipe ("connection" and "pipe" used interchangeably herein) between the client computer 112 and the network 100, via the inspection device 104, except during segment injection.

Segment injection typically results in the connection terminating, and includes, for example, an HTML page with an error description or a redirect (of a request). "Terminating," when referring to connections between the inspection device 104 and the client 112 or the external network 100 means that the existing connection (or pipe) is closed or broken, and a new connection (or pipe) must be established between the inspection device 104 and the client computer 112 and the external network 100, in order to provide links therebetween, for operation in accordance with the disclosed invention. Segment injection is, for example, used when the inspection device 104 is performing an analysis on a file, such as scanning a file for which a download has been requested.

A user 110, via her computer 112, on the internal network (e.g., the enterprise network 103), links to the inspection device 104. This linkage provides the computer 112 with access the external network 100. The computer 112 is also referred to herein as a "client" or "client computer."

The external network 100 is, for example, a communications network, such as a Local Area Network (LAN), or a Wide Area Network (WAN), including public networks such as the Internet. As shown in FIG. 1A, the external network 100 is, for example, the Internet. The external network 100, although shown as a single network, may be a combination of networks and/or multiple networks including, for example, cellular networks. "Linked" as used herein includes both wired or wireless links, either direct or indirect, such that the computers, including, servers, components and the like, are in electronic and/or data communications with each other.

Attention is now directed to FIGS. 2A-1, 2A-2 and 2B, which show a flow diagram detailing a computer-implemented process in accordance with embodiments of the disclosed subject matter. Reference is also made to elements shown in FIGS. 1A and 1B. The process and subprocesses of FIGS. 2A-1, 2A-2 and 2B are computerized processes performed by the inspection device 104, in conjunction with the client, for example, the user computer 112, which as shown represents a client or client computer. The aforementioned processes and sub-processes can be, for example, performed manually, automatically, or a combination thereof, and, for example, in real time.

FIGS. 2A-1 and 2A-2 are a process, including subprocesses, that describe modification of headers of HTTP requests (HTTP request headers), allowing for an inspection device 104 or system 106, typically within a local area network, such as an internal or enterprise network 103, to provide downloaded files, which if necessary, were manipulated transparently, to the requesting client computers.

The process starts at block 200. At this block, a client, e.g., represented by client computer 112, has connected to the external network 100, via the inspection device 104, for example, via HTTP or HTTPS connections, and has requested, for example, a file download, by transmitting (sending) a request for the file (also known as a file download request or a download request) to a destination, such as a web server 102, along an external network 100. The request is transparent through the inspection device/system 104/106.

The system 106 receives a response, from a web server 102, and determines whether the response received is a file download, at block 202. If the response received is not a file download, the process moves to block 230, where it ends. However, should the response received be for a file download, the process moves to block 204, where the file download begins. The system 106, via the inspection device 104, begins to download the data of the file (the data of the file including, for example, data for the file content, metadata, file type data), the file, which was requested in an initial or first request, which was transmitted from a client computer, e.g., computer 112.

Contemporaneous, and, for example, simultaneous, with block 204, the process moves to block 206, where the system 106 determines whether the file type can be identified. In almost all instances, the file type is identifiable, and accordingly, the process will move to block 208. However, in the rare case where the system 106 cannot identify or otherwise determine the file type, the process moves to block 230, where it ends. Block 206 is shown in detail in FIG. 2B, to which attention is directed.

Figure 2B:
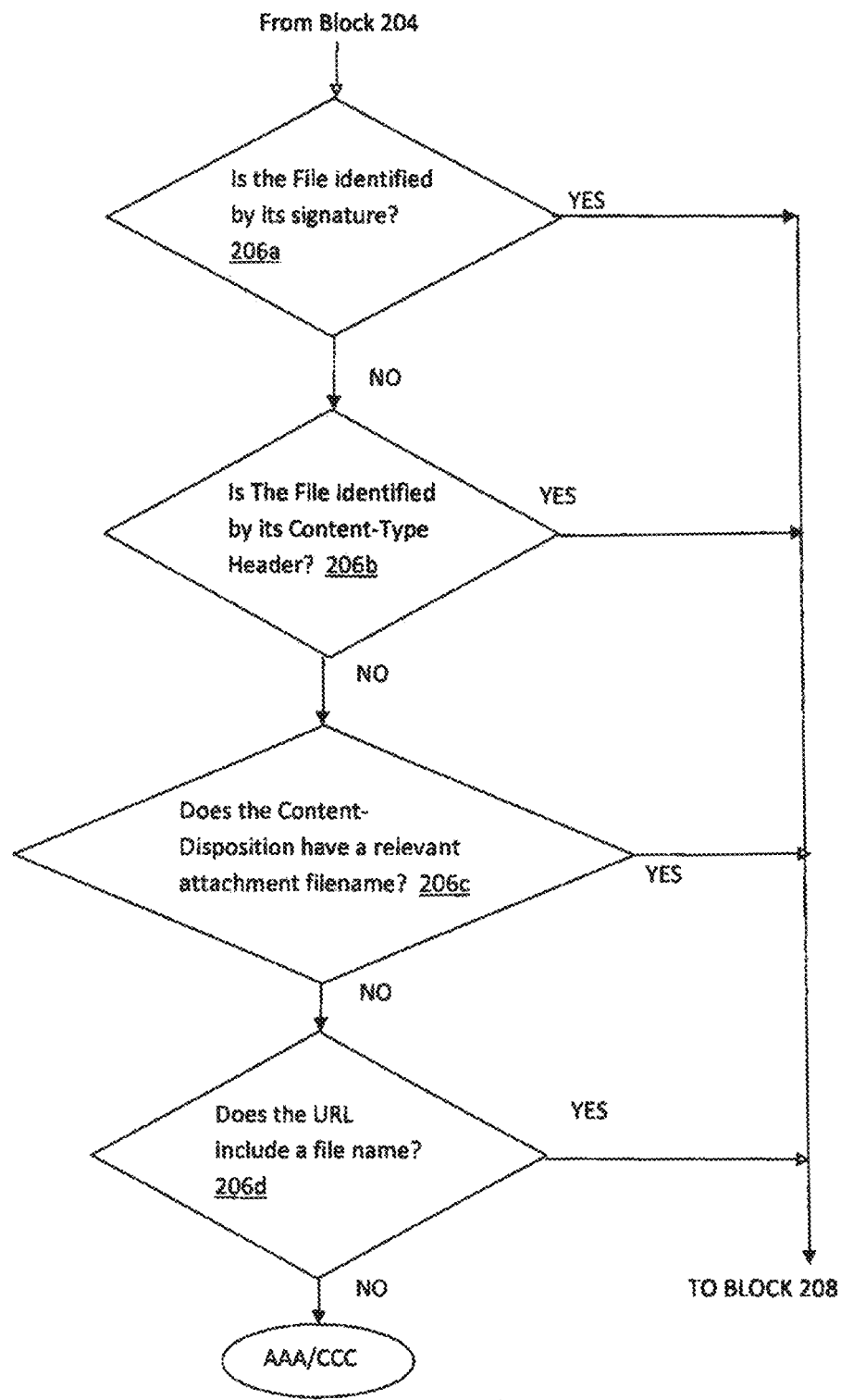
FIG. 2B is a flow diagram for a portion of the flow diagram of FIGS. 2A-1 and 2A-2.
Figures 1, 2C:
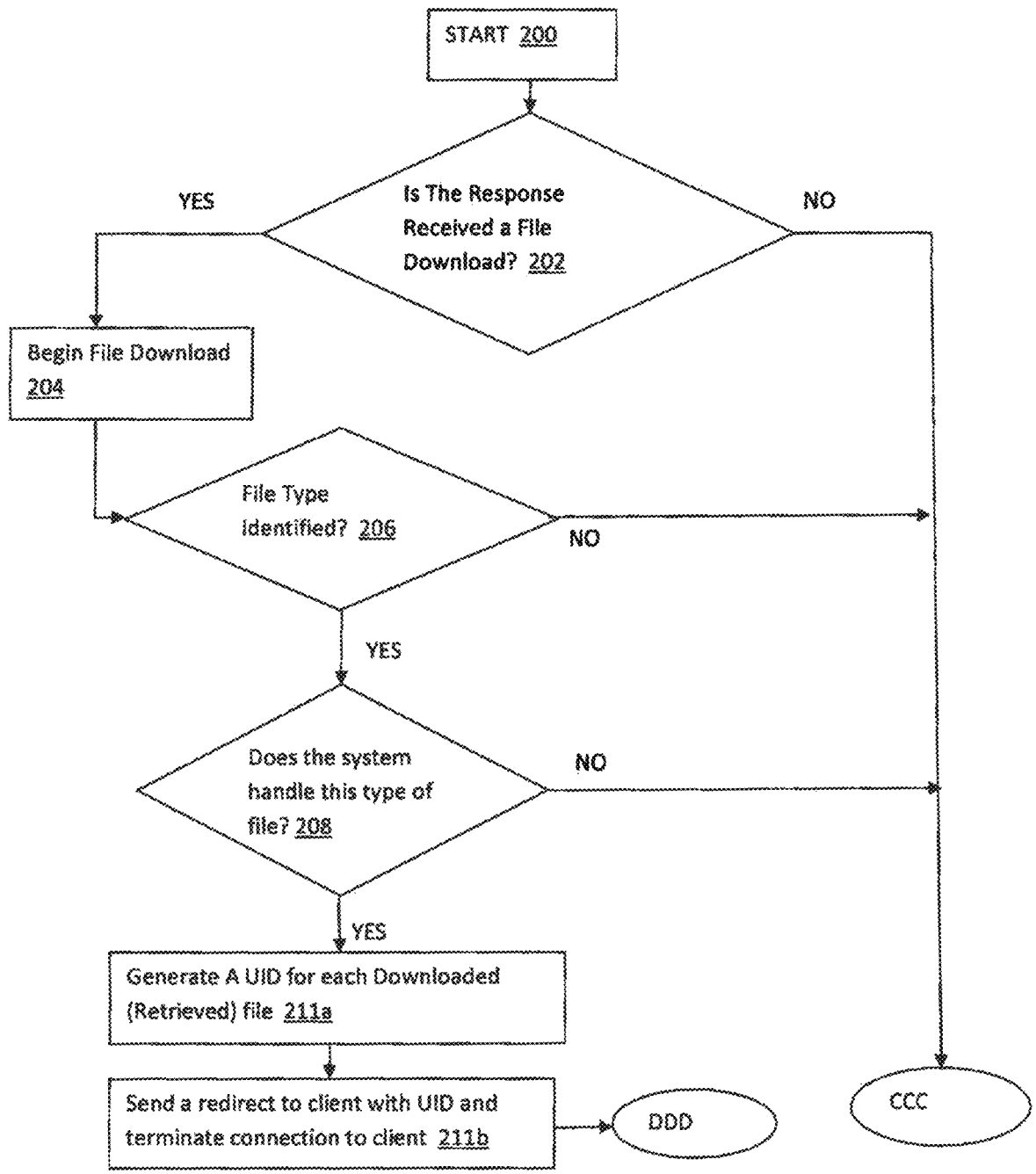
Figures 2, 2C:
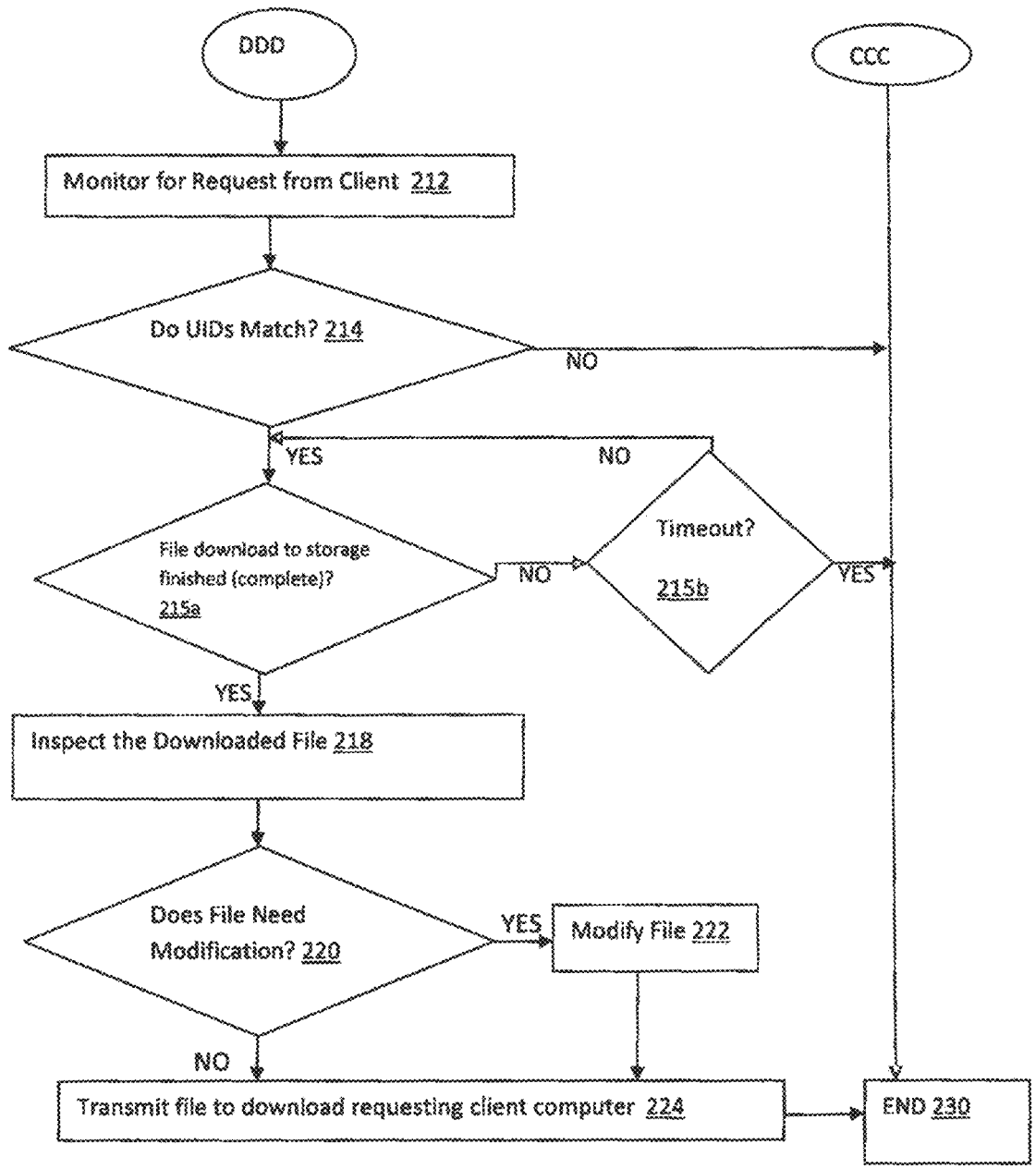

In FIG. 2B, block 206 is shown as subprocesses, of blocks 206a to 206d. The processes of blocks 206a to 206d are shown and described below in an exemplary order. However, the processes of these blocks 206a to 206d may be performed in any order, and may be performed contemporaneously, including, for example, simultaneously, and the like.

At block 206a, the system 106 determines whether the file type is identifiable by its signature. If yes, the process moves to block 208. If no, the process moves to block 206b. At block 206b, the system 106 determines whether the file is identifiable by its content-type header. If yes, the process moves to block 208. If no, the process moves to block 206c.

At block 206c, the system 106 determines whether the content disposition has a relevant attachment file name. If yes, the process moves to block 208. If no, the process moves to block 206d.

At block 206d, the system 106 checks the URL to determine whether this URL includes a file name. If yes, the process moves to block 208. If no, the file type cannot be determined, and, for example, the process defaults, by moving to block 230, where it ends.

Accordingly, from block 206, should a file type be identified or otherwise determined at any of blocks 206a to 206d, the process moves to block 208. Attention is again directed to FIGS. 2A-1 and 2A-2, to block 208.

At block 208, the system 106 determines whether it handles the identified or determined file type. The file types handled by the system 106 are those in accordance with system rules and policies, for example, stored in module 105s, and or as programmed into the system 106 by a system administrator or the like. Should the system 106 not handle this file type, the process moves to block 230, where it ends.

However, at block 208, should the system 106 handle this type of file, the subprocesses of downloading the requested file begins, as download processing of block series 210, as represented by blocks 210a to 210c, begins. The processes of blocks 210a to 210c are shown and described below in an exemplary order. However, the processes of these blocks 210a to 210c may be performed in any order, and may be performed contemporaneously, including, for example, simultaneously, and the like.

The process moves to block 210a, where the system 106, having received a file download request (this request, for example, also known as the original request) for a file type handled by the system 106, now, 1) cancels the request (e.g., the original, initial or first request), which it received from the requesting user computer, e.g., client computer 112, and, 2) terminating the connection between the inspection device 104 and the server or device, from which the file is being downloaded, for example, the web server 102

The request is cancelled for a file of an acceptable file type to be downloaded to the computer, e.g., client computer 112. This cancellation prevents the downloaded file (the download having begun previously at block 204) from being transmitted to the client computer 112 from the system 106, including the preventing of any portion of the downloaded file leaking to the requesting client computer 112 from the inspection device 104 or storage media associated therewith, of the system 106.

The process moves to block 210b, where the downloaded file is assigned a unique identifier (UID), which has been generated by the system 106 for this particular file. This UID is, for example, a token, similar to those shown, for example, in the table of FIG. 1B.

The process moves to block 210c, where the system 106, 1) sends a redirect to the client computer with the generated UID, e.g., token, and, 2) terminates the connection between the inspection device 104 and the client, e.g., client computer 112.

This redirect (also known as a "redirect request", these terms used interchangeably herein), which is sent to the client (e.g., client computer 112), maps to the system 106, and the redirect, one it reaches the client (client computer 112) is automatically transmitted to the system 106 in a request or response (which is known as the second or subsequent request, as it is a second or subsequent request to download the requested file). The redirect is formed as the inspection device 104 injects a redirect response into the data, which is to be sent to the requesting client computer, prior to the connection terminating.

The client computer, e.g., computer 112, having received this redirect, automatically transmits a request for the file to be downloaded to the system 106, and for which the system 106 monitors the internal network 103 for this request, at block 212. This request, since it is transmitted after the original request, is known as a subsequent or second request. This subsequent request includes the UID of the redirect as well as the data needed to obtain the downloaded file by the client computer 112.

Once the request, for example, the second or subsequent request is received by the system 106, at block 212, the process moves to block 214. At block 214, the system 106 determines whether the UID of the subsequent request matches, or otherwise correlates with, including being equivalent to, the UID generated for the file, for example, as recorded in the table 105r, or other storage media. The matching or correlation, including equivalence, is, for example, in accordance with system 106 rules, policies, and the like. Should the UIDs not match or correlate, including being equivalent, the process moves to block 230 where it ends. Should there be a UID match or correlation, the process moves to block 216.

At block 216, the system 106 downloads (retrieves) the file of the subsequent request from the external network 100. This download goes to completion, as the system 106 of the inspection device 104 must have a copy of the downloaded file. The now downloaded file is typically stored in storage media, e.g., storage media 105t, prior to further processing (of blocks 218, 220, 222, 224). The request to download the file, also known as the file download request, or the download request, has the same HTTP header(s) as those of the subsequent request. The HTTP headers are used to simulate the original request (described above for block 200). For example, the downloaded file is file 102a with the name XYZ.doc, from the server 102.

The process moves to block 218, where the downloaded file is inspected, for example, in accordance with system rules and policies (of module 105s). The process moves to block 220, where based on the rules and policies, the system 106 determines whether the file is to be modified. Should the file not need to be modified, as per the aforementioned rules and policies, the process moves to block 224. For example, rules and policies may be such that .doc files do not need to be modified or otherwise augmented, and may be transmitted to the client computer in their present state, e.g., "as is."

Returning to block 220, should the file need to be modified, as per the aforementioned rules and policies, the process moves to block 222, where the file is modified. Modifications may range from removing or neutralizing malicious or potentially malicious content from the files and/or changing the file types themselves, for example, rendering a .jpg file as a .pdf file. With the file modified, the process moves to block 224.

At block 224, from either of blocks 220 or 222, the system 106 transmits the file, in its non-modified or modified state, to the download requesting client computer, e.g., computer 112. The process is now finished, and the process moves to block 230, where it ends.

Attention is now directed to FIGS. 2C-1, 2C-2 and 2B, which show a flow diagram of an alternative process. In this alternative process, the download occurs once, for example, as a single process, as once the download of the file begins, it completes as the downloaded file is stored in storage media associated with the inspection device 104 of the system 106. This alternative process is identical or similar in many aspects to the processes of the flow diagram of FIGS. 2A-1 and 2A-2, such that identical or similar steps are numbered identically and the descriptions for these blocks (processes) from FIGS. 2A-1 and 2A-2 are applicable here, with differences, shown by "odd" numbered blocks, described below.

Initially, for this alternative process, blocks 200, 202, 204, 206, 208 and 230 are identical to those for the process of FIGS. 2A-1 and 2A-2. From block 208, the process moves to block 211, represented by blocks 211a and 211b. The processes of blocks 211a to 211b are shown and described below in an exemplary order. However, the processes of these blocks 211a to 211b may be performed in any order, and may be performed contemporaneously, including for example, simultaneously, and the like.

At block 211*a*, the downloaded file is assigned a UID, which has been generated by the system 106 for this particular file. This UID is, for example, a token, similar to those shown, for example, in the table of FIG. 1B.

The process moves to block 211*b*, where the system 106, 1) sends a redirect request to the client computer with the generated UID, e.g., token, and, 2) terminates the connection between the inspection device 104 and the client, e.g., client computer 112.

This redirect, which is sent to the client, is such that it automatically maps back to the system 106. The redirect is such that the inspection device 104 injects a redirect response into the data, which is to be sent to the requesting client computer, prior to the connection terminating.

The client computer, e.g., computer 112, having received this redirect, automatically transmits a request for the file to be downloaded to the system 106, and for which the system 106 monitors the internal network 103 for this request, at block 212. This redirect request, since it is transmitted after the original request, is known as a subsequent request. This subsequent request includes the UID of the redirect request as well as the data needed to obtain the downloaded file by the client computer 112.

Once the request, for example, the subsequent, for example, a second, request is received by the system 106, at block 212, the process moves to block 214. At block 214, the system 106 determines whether the UID of the subsequent request matches, or otherwise correlates, including being equivalent, with, the UID generated for the file, for example, as recorded in the table 105*r*, or other storage media. The matching or other correlation (including equivalence) is, for example, in accordance with system 106 rules, policies, and the like. Should the UIDs not match or correlate, the process moves to block 230 where it ends. Should there be a UID match or correlation, including equivalence, the process moves to block 215*a*.

At block 215*a*, the file is downloaded to storage, the storage being associated with the inspections device 104, such as storage media 105*t*. At block 215*a*, the complete file has been downloaded into, and the download is complete (finished). The system 106 waits for the file download to complete, regardless of when the system 106 receives the subsequent request.

Should the download not be complete at block 215*a*, the process moves to block 215*b*, where it is determined whether the system 106 timed out and the download will not be completed. Should there be a timeout, the process moves to block 230, where it ends. Should there not be a timeout, the process returns to block 215*a*, from where it continues.

Returning to block 215*a*, should the download be complete, the process moves to block 218. From block 218, the process moves forward to blocks 220, 222, 224 and 230, as detailed for the flow diagram of FIGS. 2A-1 and 2A-2 above.

In an alternative process to the processes of FIGS. 2A-1 and 2A-2, the process of block 214 is not performed. Accordingly, the process goes from blocks 212 to 216. In this alternative process, the download process of block 210*a* continues to completion, as the connection between the inspection device 104 and the web server, e.g. server 102 along the external network, e.g., network 100 is maintained (e.g., kept open and is not terminated). Process blocks 210*b* and 210*c* remain the same. The now downloaded file is saved on the inspection device 104, in internal or external storage media, without being sent to the client, until the system 106 receives the subsequent request at block 212 and the UIDs match, at block 214. The process resumes from block 214, as detailed above.

Figure 3A:
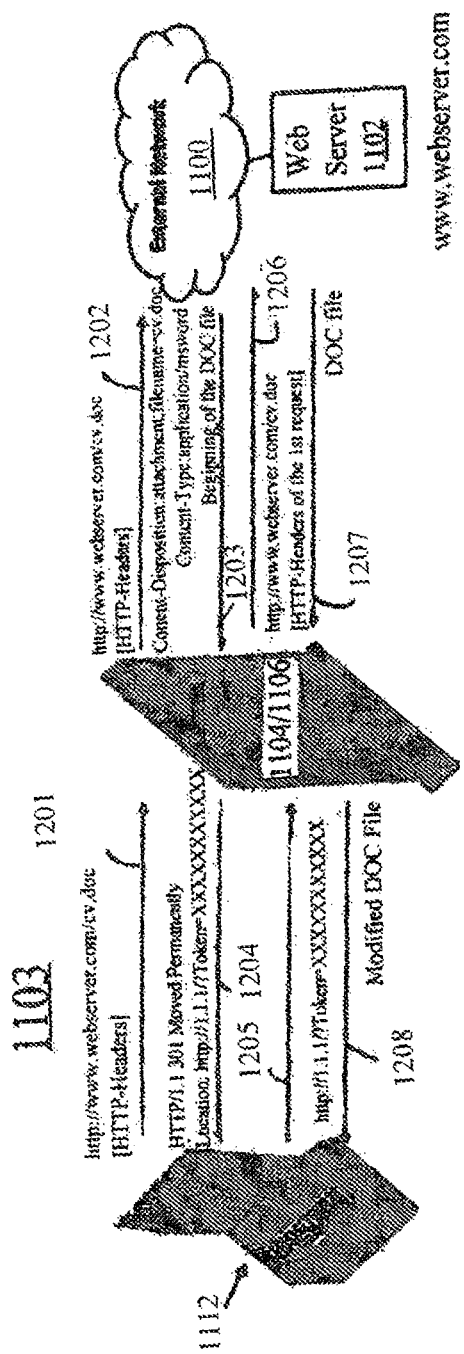
FIG. 3A is a diagram showing an exemplary operation of the process of FIGS. 2A-1, 2A-2 and 2B, in accordance with the present invention; and, FIG. 3B is a diagram showing an exemplary operation of the alternative process of FIGS. 2C-1, 2C-2 and 2B, in accordance with the present invention.

FIG. 3A shows an example of the present invention, where macros are removed from a DOC file, which has been download from a web server 1102, with the URL www-.webserver.com. In FIG. 3A, references to elements which are the same or similar as those of FIG. 1A are numbered in the "1100s" and are in accordance with the descriptions as per FIG. 1A (above).

Initially, a request (e.g., a download request), such as an initial or first request for a file is inspected at the inspection device/system 1104/1106, as transmitted from the client computer 1112, as per arrow 1201. The initial or first request is an HTTP request, http://www.webserver.com/cv.doc. This request is passed through the inspection device 1104 to the web server 1102, as per arrow 1202.

The web server 1102 sends the file corresponding to the request, and the file is detected by the inspection device/system 1104/1106, as per arrow 1203. The system 1106, for example, applying rules and policies, has determined that the file should be modified, for example, based on the rule that .doc files are to be modified, and this file is a .doc file. The system 1106 downloads the file with the same HTTP headers of the initial or first request. The system 1106 cancels the original request (e.g., download request). However, when necessary, the system 1106 generates a new file download request with the same HTTP headers of the initial or first (file download or download) request.

The system 1106, sends (transmits) a redirect request (a subsequent or second request), to the client computer 1112, as per arrow 1204. The redirect request includes a unique identifier (UID), for example a token, shown as XXXXXXXXXXX, associated with the file which has been or is in the process of being downloaded by the system 1106. This redirect request is self-executing, and is automatically transmitted from the client computer 1112 to the inspection device/system 1104/1106, as per arrow 1205.

With the redirect request, i.e., the subsequent or second request received at the inspection device/system 1104/1106, as per arrow 1205, the system 1106 compares the token in the received subsequent or second request, to a stored token associated with the requested file, in a database, such as that of FIG. 1B. Should the tokens match, the system 1106 generates a new file download request, which includes the same HTTP headers of the first request. The new file download request is transmitted from the system 1106 to the web server 1102, as per arrow 1206, such that the file or any remaining portion thereof that has not reached the inspection device/system 1104/1106, is rendered, and sent by the web server 1102 or downloaded from the web server 1102 by the system 1106, as per the arrow 1207. Should the tokens not match, the aforementioned rendering of the requested (from the subsequent or second request) does not occur.

With the rendering complete, the system 1106 modifies the file, if necessary, and sends the file/modified file to the client computer 1112, as per arrow 1208.

Figure 3B:
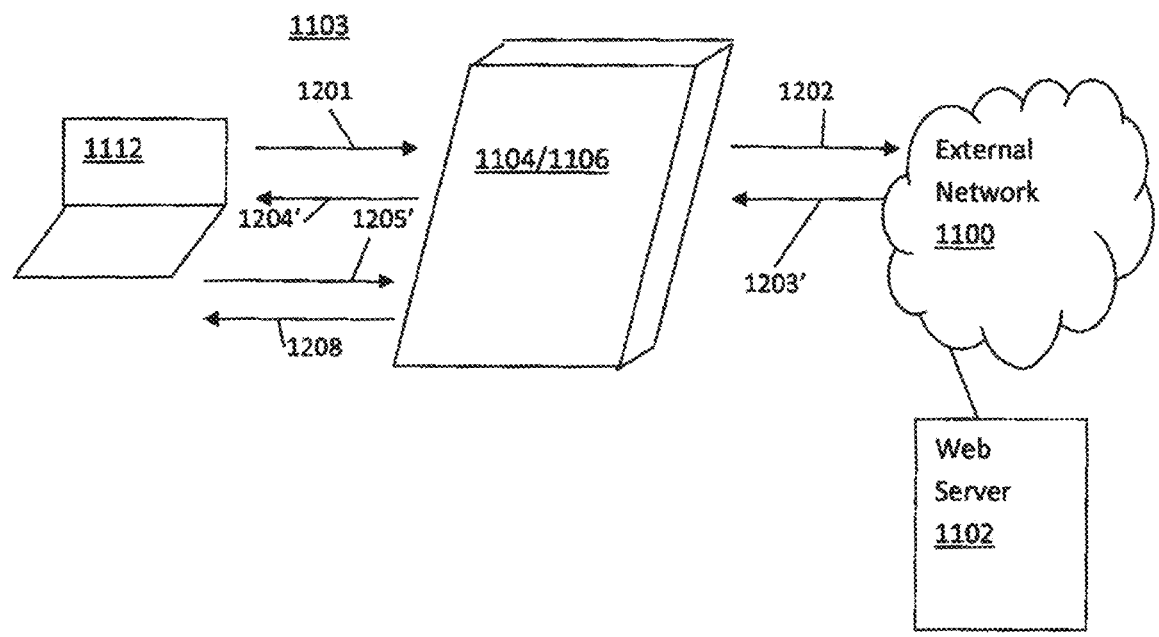

Alternatively, as shown in FIG. 3B, like that of FIG. 3A, the request of arrow 1201 is passed by the inspection device 1104 to the web server 1102, as per arrow 1202. The system 1106 waits for the file download to complete, and buffers all of the data of the downloaded file, as per arrow 1203'. At this time, the file has not been sent or otherwise transmitted to the client computer 1112. However, the system 1106 has sent (transmitted) a redirect request to the client computer 1112, as per arrow 1204'.

The system 1106 waits for the subsequent or second request, e.g., a "get" request from the redirect request, of arrow 1205'. Because the system 1106 already has the file, it does not partake in the second rendering of the file, represented by the arrows 1206 and 1207 of FIG. 3A. Modifications of the downloaded file can be either when the file downloaded to the system 1106 is complete (arrow 1203'), or when the subsequent request, e.g., the redirect "get" request is received (arrow 1205'), and the tokens are matched. Once received, the system 1106 sends (transmits) the file/modified file to the client computer 1112, as per arrow 1208.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for manipulating a file comprising:
   using a computerized inspection device for: 1) receiving a response including a file download request from a client computer, and 2) obtaining Hypertext Transport Protocol (HTTP) headers of the file download request;
   using the computerized inspection device for downloading the file associated with the file download request, canceling the file download request, and associating the downloaded file with an indicator, the computerized inspection device maintaining the downloaded file to prevent leaking of the downloaded file from the computerized inspection device;
   transmitting, by the computerized inspection device, a redirect request including an indicator of the redirect request, the redirect request associated with the downloaded file and the indicator associated with the downloaded file, to the client computer;
   receiving, by the computerized inspection device, from a client computer, the redirect request;
   correlating, by the computerized inspection device, the indicator of the redirect request and the indictor of associated with the downloaded file, by matching the indicator of the redirect request and the indictor associated with the downloaded file;
   inspecting the downloaded file, by the computerized inspection device, to determine whether the downloaded file is to be modified;
   performing at least one of modifying or not modifying the downloaded file based on the determination; and
   transmitting, by the computerized inspection device, the downloaded file, as one of either modified or not modified, to the client computer, when the indicator of the redirect request and the indicator associated with the downloaded file are correlated.

2. The method of claim 1, wherein the redirect request is self-executing.

3. The method of claim 1, where the determining whether the downloaded file is to be modified is in accordance with rules and policies.

4. The method of claim 1, wherein the response is returned to the computerized inspection device from a computer along a network external to the computerized inspection device.

5. The method of claim 1, wherein the indicator includes at least one of a token, and, a unique identifier.

6. The method of claim 1, wherein the response is based on a file download request issued from a client computer, the file download request which has passed through the computerized inspection device.

7. The method of claim 6, wherein the computerized inspection device, after canceling the download request:
   generates a new file download request including the HTTP headers from the file download request.

8. The method of claim 7, wherein the computerized inspection device transmits the new file download request including the HTTP headers to a destination associated with the file of the file download request, in response to: a) receiving, by the computerized inspection device, from the client computer, the redirect request, and, b) the computerized inspection device correlating the indicator of the redirect request and the indictor of the downloaded file.

9. A computer-usable non-transitory storage medium having a computer program embodied thereon for causing a suitable programmed system to manipulate a computer file, by performing the following steps when such program is executed on the system, the steps comprising:
   receiving a response including a file download request from a client computer and obtaining Hypertext Transport Protocol (HTTP) headers of the file download request;
   downloading the file associated with the file download request, canceling the file download request, and associating the downloaded file with an indicator, and, maintaining the downloaded file to prevent leaking of the downloaded file from a computerized inspection device;
   transmitting a redirect request including an indicator of the redirect request, the redirect request associated with the downloaded file and the indicator associated with the downloaded file, to a client computer;
   receiving from the client computer, the redirect request;

correlating the indicator of the redirect request and the indictor associated with the downloaded file, by matching the indicator of the redirect request and the indictor associated with the downloaded file;

inspecting the downloaded file, by the computerized inspection device, to determine whether the downloaded file is to be modified;

performing at least one of modifying or not modifying the downloaded file based on the determination; and transmitting the downloaded file, as one of either modified or not modified, to the client computer, when the indicator of the redirect request and the indicator associated with the downloaded file are correlated.

10. The computer-usable non-transitory storage medium of claim 9, wherein the indicator of the redirect request includes at least one of a token, and a unique identifier.

11. The computer-usable non-transitory storage medium of claim 10, wherein the redirect request is self executing.

12. The computer-usable non-transitory storage medium of claim 10, where the determining whether the downloaded file is to be modified is in accordance with rules and policies.

13. The computer-usable non-transitory storage medium of claim 9, wherein the response is received from a computer along an external network associated with a file for which a download has been requested.

14. The computer-usable non-transitory storage medium of claim 9, wherein the response is based on a file download request issued from a client computer.

15. The computer-usable non-transitory storage medium of claim 14, additionally comprising the steps of:
generating a new file download request including the HTTP headers from the file download request.

16. The computer-usable non-transitory storage medium of claim 15, additionally comprising the step:
transmitting the new file download request including the HTTP headers to a destination associated with the file of the file download request, in response to: a) receiving, the redirect request, and, b) the correlating of the indicator of the redirect request and the indictor of the downloaded file.

17. A computerized inspection device comprising:
storage media for holding downloaded files; and
a processor in communication with the storage media, the processor programmed to:
receive a response including a file download request issued from a client computer, which has passed through the computerized inspection device, and obtain Hypertext Transport Protocol (HTTP) headers of the file download request;
download the file associated with the download request for storage in the storage media, and canceling the file download request, and, associate the downloaded file with an indicator;
cause the storage media to maintain the downloaded file by preventing leaking of the downloaded file from the storage media;
transmit a redirect request including an indicator of the redirect request, the redirect request associated with the downloaded file and the indicator associated with the downloaded file, to the client computer;
receive, from the client computer, the redirect request;
correlate the indicator of the redirect request and the indictor associated with the downloaded file, by matching the indicator of the redirect request and the indictor associated with the downloaded file;
inspect the downloaded file, by the computerized inspection device, to determine whether the downloaded file is to be modified;
perform at least one of modifying or not modifying the file based on the determination; and
transmitting the downloaded file, as one of either modified or not modified, to the client computer, when the indicator of the redirect request and the indicator associated with the downloaded file are correlated.

18. The computerized inspection device of claim 17, wherein the processor programmed to inspect the downloaded file performs the determining of whether the downloaded file is to be modified is based on rules and policies.

* * * * *